United States Patent
Songer et al.

(10) Patent No.: US 7,913,100 B2
(45) Date of Patent: Mar. 22, 2011

(54) OPPORTUNISTIC INITIATION OF DATA TRAFFIC

(75) Inventors: Neil Songer, Santa Clara, CA (US); Seh W. Kwa, Saratoga, CA (US); Jim Kardach, Saratoga, CA (US); Darren Abramson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 11/906,001

(22) Filed: Sep. 29, 2007

(65) Prior Publication Data

US 2009/0089606 A1     Apr. 2, 2009

(51) Int. Cl.
*G06F 1/32*     (2006.01)

(52) U.S. Cl. .......................... 713/323; 713/320

(58) Field of Classification Search ................. 713/323, 713/320
See application file for complete search history.

(56) References Cited

U.S. PATENT DOCUMENTS

| | | | | |
|---|---|---|---|---|
| 5,546,538 | A * | 8/1996 | Cobbley et al. | 709/203 |
| 6,609,072 | B1 * | 8/2003 | Yamagata | 702/64 |
| 6,691,233 | B1 * | 2/2004 | Gannage et al. | 713/300 |
| 6,938,174 | B2 * | 8/2005 | LeKuch et al. | 713/320 |
| 6,971,034 | B2 * | 11/2005 | Samson et al. | 713/300 |
| 7,240,228 | B2 * | 7/2007 | Bear et al. | 713/320 |
| 7,707,437 | B2 * | 4/2010 | Berenbaum et al. | 713/300 |
| 2008/0276108 | A1 * | 11/2008 | Surgutchik et al. | 713/323 |

* cited by examiner

*Primary Examiner* — Chun Cao
(74) *Attorney, Agent, or Firm* — Blakely, Sokoloff, Taylor & Zafman LLP

(57) ABSTRACT

A method for trafficking data based at least in part on a power condition of a system resource. In one embodiment of the invention, a data trafficking device initiates data traffic in response to a detecting of an indication of the power condition. In another embodiment of the invention, the detected indication is independent of any data traffic of the data trafficking device.

17 Claims, 5 Drawing Sheets

OPPORTUNISTIC INITIATION OF DATA TRAFFIC

BACKGROUND OF THE INVENTION

1. Field of the Invention

The invention relates generally to trafficking data between a device and a target resource. More particularly, some embodiments of the invention initiate data traffic based on an indication of a power condition in a system resource.

2. Background Art

In a data trafficking system, efficient data trafficking often depends on how system components operate with respect to one another. For example, a data trafficking device trafficking data with a target resource in such a system may have to coordinate with various system resources, such as the target resource itself and/or interface resources which facilitate trafficking data between the target resource and the data trafficking device. Some systems include resources which can variously operate in different power states, where a given power state is associated with a particular capacity to facilitate data trafficking. For example, a particular system resource may be able to operate either in an active power state associated with its full capacity to facilitate data trafficking, or in an inactive power state associated with a lower capacity to facilitate data trafficking. Generally, higher capacities to facilitate data trafficking correspond to power states of system resources which consume more system power.

Complex systems may have one or more data trafficking devices variously trafficking data at any given time. As the scale of data trafficking in these systems increases, there is an increased likelihood that at any given time, a particular system resource will be required to operate in an active power state to facilitate some data trafficking initiated by a particular data trafficking device. Over time, this increased likelihood results in a system resource having to more frequently remain in an active state, operating at higher rates of power consumption for longer periods of time. This increased likelihood also results in system resources having to come out of inactive or power managed states after shorter periods of lowered power consumption. Also, this increased likelihood results in system resources having to more frequently switch between higher and lower power states associated with higher and lower capacities to facilitate data trafficking. Consequently, system resources which can variously operate in different power states are more likely to cause increased system power consumption and inefficiently switch power states as the amount of data trafficking in the system increases.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
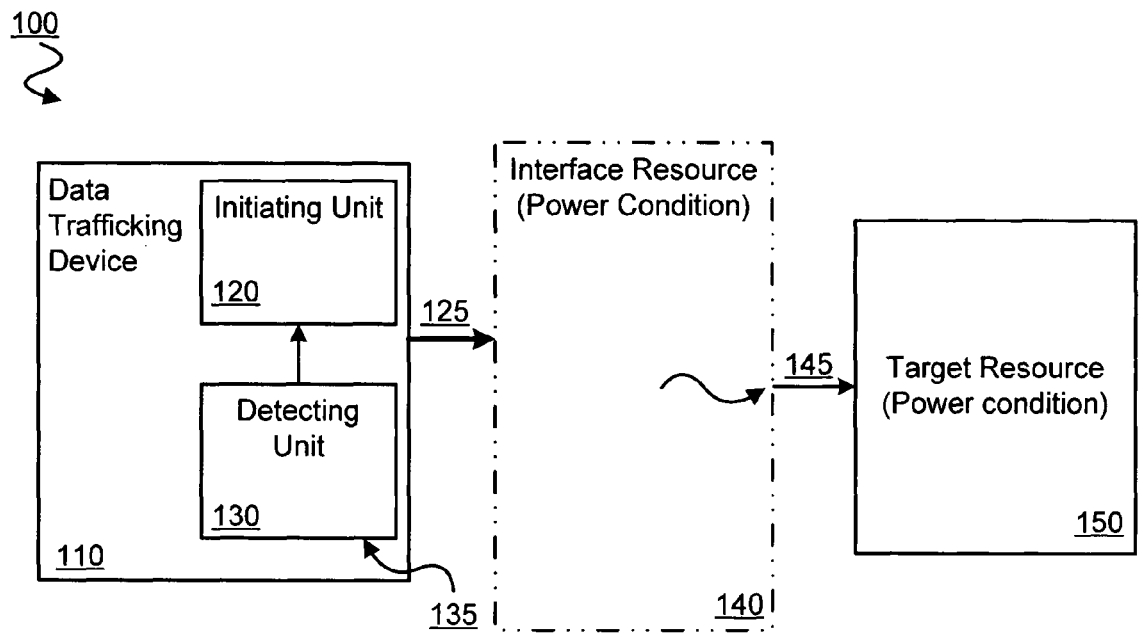
FIG. 1 is a block diagram illustrating a data trafficking system according to an embodiment of the invention.

FIG. 1 illustrates a data trafficking system 100 according to an embodiment of the invention. Data trafficking system 100 may, for example, be variously implemented on one of a server platform (e.g. in a blade server), desktop computer platform (e.g. on a motherboard) and a mobile platform. System 100 includes a data trafficking device 110 configured for communication with target resource 150 via interface resource 140. Data trafficking device 110 may include any of a variety of devices for receiving and/or sending data in system 100. For example, data trafficking device 110 may be any of a variety of devices for conveying information to and/or from system 100 including, but not limited to a visual display device, a keyboard, a mouse, a speaker, wireless network device, TV tuner, and a modem. Data trafficking device 110 may communicate with other devices external to system 100, e.g. via a wireless transceiver.

Interface resource 140 may include any resource supporting the trafficking of data between data trafficking device 110 and a target resource. An interface resource 140 may include one or more interface elements. For example, interface resource 140 may have any of a variety of combinations of hardware and/or software interface elements including, but not limited to, a bus, a bridge, a controller, a reference clock mechanism such as a clock tree to synchronize other interface elements, and circuitry supporting an interface specification—e.g. Desktop Management Interface (DMI) Specification, Version 2.0s, Desktop Management Taskforce, Inc., Jun. 24, 1998.

Target resource 150 may include any resource to facilitate the storing and/or processing (e.g. analyzing or converting) of data sent to and/or received from a data trafficking via the interface resource 140. The target resource 150 may include one or more target resource elements. For example, the target resource 150 may include any of a variety of combinations of memory elements including, but not limited to read-only memory (ROM), random access memory (RAM) such as static RAM (SRAM) and dynamic RAM (DRAM), and non-volatile memory such as flash memory. Additionally or alternatively, target resource 150 may itself include a data trafficking device similar to data trafficking device 110. Target resource 150 may further include clock timing, processing, power and/or other elements enabling the operation of target resource 150.

Interface resource 140 and target resource 150 may be referred to more generally as system resources, at least insofar as they are resources of system 100 of which a device such as data trafficking device 110 may avail for facilitating data traffic. In various embodiments of the invention, a given system resource may at a particular time have a particular power condition. A system resource or an element thereof may at various times operate in different power states. For example, a system resource such as interface resource 140 or target resource 150 may be able to change between (1) operating in an active (e.g. high voltage level and/or high frequency) state associated with a particular level of power consumption and a particular capacity to facilitate data trafficking, and (2) operating in a power managed (e.g. low voltage level and/or low frequency) state associated with a lower level of power consumption and a different capacity to facilitate data trafficking. A power condition of a system resource may include a power state of the system resource (and/or an element thereof). Alternatively or in addition, a power condition of the system resource may include a transition (and/or a rate of transition) in a power state of the system resource (and/or an element thereof). Alternatively or in addition, a power condition of a system resource may include an existing power state (or transition or rate of transition thereof) and/or an expected future power state (or transition or rate of transition thereof).

In various embodiments of the invention, data trafficking device 110 may initiate traffic data based at least in part on a power condition of a system resource. By way of illustration, a power condition of target resource 150 may result in an opportunity for data trafficking device 110 to initiate a trafficking of data in system 100. At a particular time, for example, a data traffic 145 to and/or from target resource 150 may require target resource 150 to include an active power state required for such data traffic 145. As will be discussed hereafter, data traffic 145 may result in various different direct or indirect indications may be generated in system 100 which indicate a power condition of a system resource (e.g. the power state of data source 150).

In the case of system 100, an indication 135 is received by detecting unit 130 of data trafficking device 110. Detecting unit 130 may, for example, include any of a variety of current, voltage, or power sensors, data processing elements or similar means for detecting the indication 135 as indicating a power condition of a system resource. In an embodiment of the invention, the indication 135 of a power condition of a system resource may be independent of any data traffic of data trafficking device 110. For example, indication 135 may be independent of data trafficking device 110 sending a communication to initiate particular data traffic. By way of illustration, indication 135 may result from data traffic of another data trafficking device (not shown) or from a predictable operation of system resources which is not in response to any data traffic of data trafficking device 110. According to an embodiment of the invention, detecting unit 130 may direct initiating unit 120 of data trafficking device 110 to initiate some data traffic in response to the indication 135. For example, initiating unit 120 may initiate data traffic 125 of data trafficking device 110, which may include sending data from (and/or receiving data at) data trafficking device 110.

Initiating data traffic refers to performing some action which will, either directly or indirectly, result in some communication of data by a data trafficking device. For example, initiating data traffic 125 may include sending a signal from data trafficking device 110 to a system resource or to another data trafficking device, wherein the signal indicates a need for data to be trafficked. Additionally or alternatively, initiating data traffic may include data trafficking device 110 performing actions internal to itself which may induce the sending of data to and/or from data trafficking device 110.

For example, data trafficking device 110 may include an input data buffer (not shown) to be automatically written to by target resource 150 once the amount of data stored in the input data buffer is below a minimum threshold. In response to detecting an indication 135 that a particular power condition allows target resource 150 to perform writes to the input data buffer, data trafficking device 110 may initiate an automatic write to the input data buffer by debuffering data from the input data buffer until the amount of data stored in the data buffer is below the minimum threshold.

Similarly, data trafficking device 110 may include an output data buffer (not shown) to write data to target resource 150 once the amount of data stored in the output data buffer is above a maximum threshold. In response to detecting an indication 135 that a particular power condition allows target resource 150 to receive buffered data, data trafficking device 110 may initiate an automatic write 125 to the target resource 150 by buffering data until the amount of data stored in the output data buffer is above the maximum threshold.

The initiated data traffic may include the sending of data to and/or from a particular target resource, an indication of whose power condition has been detected by the data trafficking device 110. Alternatively or in addition, the initiated data traffic may include sending data to another target resource, e.g. via an interface resources separate from a particular interface resource by which the data trafficking device 110 received an indication of a power condition of a system resource.

In various embodiments of the invention, the opportunistic initiation of data traffic (e.g. initiating data traffic to take advantage of a system resource power condition) may further be in response to determining a data exchange which justifies the initiating of data traffic. For example, a particular initiating of data traffic may be based on a relative benefit of initiating the data traffic in relation to a performance overhead associated with the initiated of data traffic. A data exchange which justifies the initiating of data traffic may be determined based on any of a variety of combinations of factors including, but not limited to, a status of the data trafficking device (e.g., available download/upload rates and/or existing processing load), a condition of one or more system resources (e.g. an expected communication rate of a system resource or an expected delay in acquiring authorization for data traffic), and an amount of data to be exchanged and a type of data to be exchanged (e.g. whether some minimum amount of the data can be exchanged in the data traffic)

Figure 2:
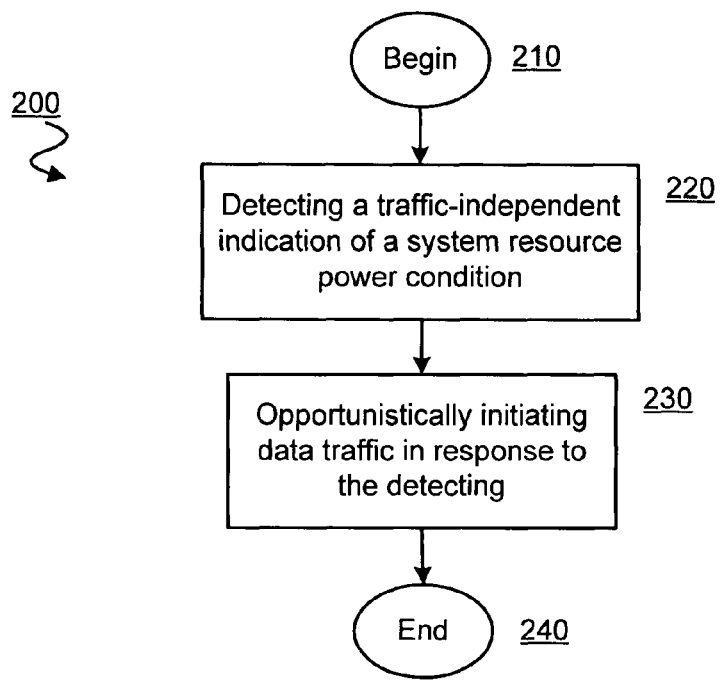
FIG. 2 is a flow diagram illustrating an algorithm according to one embodiment of the invention.

FIG. 2 illustrates an algorithm 200 for a method implementing one embodiment of the invention. Algorithm 200 may be implemented, for example, by a data trafficking device such as data trafficking device 110. The algorithm 200 begins at 210, wherein a data trafficking device is configured to traffic data with a target resource via an interface resource. At 220, the data trafficking device may detect an indication of a system resource power condition. In one embodiment, the system resource power condition may include a condition of an interface resource and/or a target resource. As discussed previously, the indication detected by the data trafficking device may be independent of any data traffic of the data trafficking device.

At 230, the data trafficking device may opportunistically initiate data traffic in response to the detecting of the indication at 220. Opportunistically initiating data traffic refers to the data trafficking device taking advantage of the indicated power condition in trafficking data. For example, the data trafficking device may avail of an already existing opportunity to exploit the indicated power condition by trafficking data with a target resource such as target resource 150. As discussed below, the opportunistic initiating of data traffic at 230 may further be in response to other conditions of the data trafficking device and/or system resources. At 240, the algorithm 200 ends with the data trafficking device having initiated data traffic without having to invoke a particular power condition which may otherwise have to be invoked for such a trafficking of data.

Figure 3A:
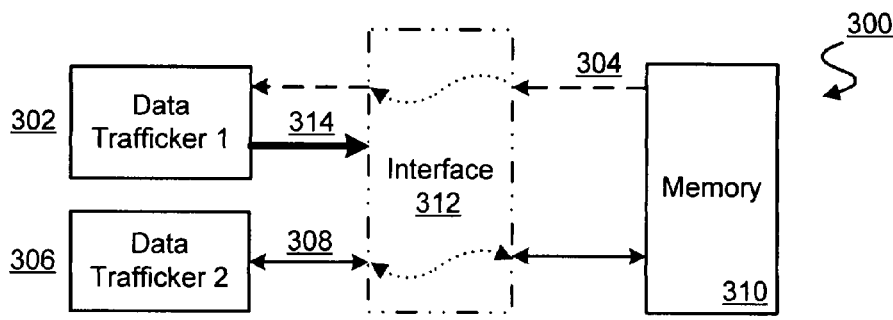
FIGS. 3A-3D are block diagrams illustrating data trafficking systems according to embodiments of the invention.
Figure 3B:
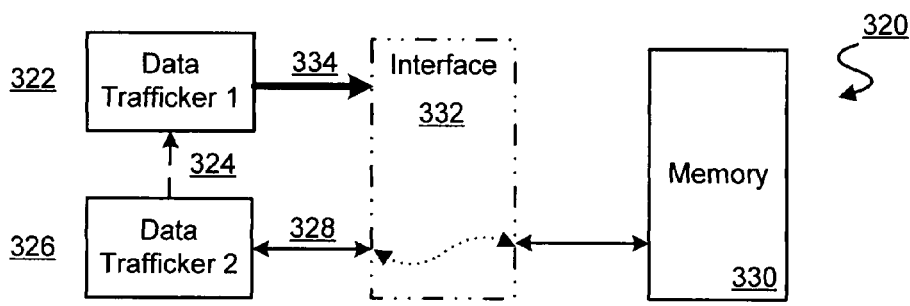
Figure 3C:
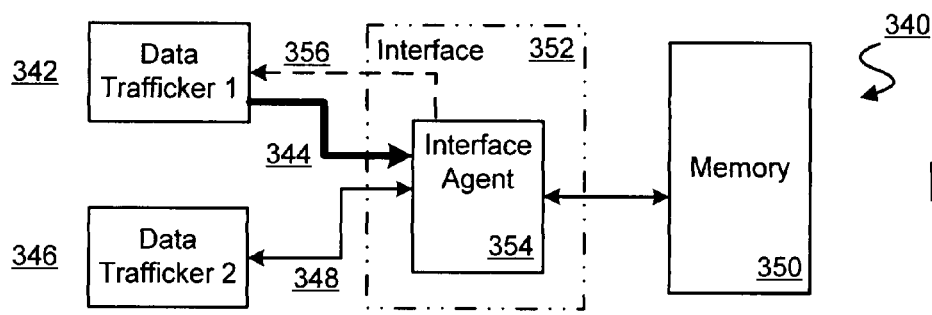
Figure 3D:
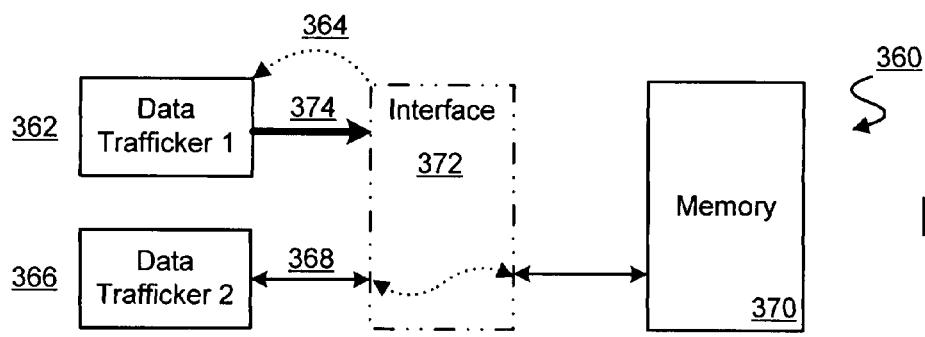

FIGS. 3A-3D illustrate systems 300, 320, 340 and 360, each capable of variously implementing opportunistic data trafficking according to embodiments of the invention. FIG. 3A illustrates a system 320 wherein Data Trafficker 1 302 and a Data Trafficker 2 306 each communicate with at least memory 310 via an interface 312. Similarly, FIG. 3B illustrates a system 320 wherein Data Trafficker 1 322 and a Data Trafficker 2 326 each communicate with at least memory 330 via an interface 332. Similarly, FIG. 3C illustrates a system 340 wherein Data Trafficker 1 342 and a Data Trafficker 2 346 each communicate with at least memory 350 via an interface 352. Lastly, FIG. 3D illustrates a system 360 wherein Data Trafficker 1 362 and a Data Trafficker 2 366 each communicate with at least memory 370 via an interface 372. Although exemplary embodiments of the invention are described herein with reference to data trafficking devices trafficking data with memory devices, the invention may be extended to also apply to data trafficking devices trafficking data with other system resources such as another data trafficking device. In various embodiments of the invention, a data trafficker in one of systems 300, 320, 340 and 360 may variously include characteristics and elements discussed above with reference to data trafficking device 110. Embodiments of the invention are described herein with reference to data traffickers 302, 322, 342 and 362 respectively initiating data traffic 314, 334, 344 and 374 in response to detecting respective indications 304, 324, 356 and 364 of power conditions of system resources.

In the example of system 300, Data Trafficker 1 302 opportunistically initiates data traffic 314 in response to detecting an indication of a power condition associated with memory 310. For example, data traffic 308 of Data Trafficker 2 306 via interface 312 may require that memory 310 includes a power state which is also conducive to Data Trafficker 1 302 initiating a different data traffic 314. The opportunity to avail of the power state of memory 310 may be made know to Data Trafficker 1 302, for example, by an indication 304 of a power condition including the power state of memory 310. In an embodiment of the invention, an indication of the power condition of a system resource may include an explicit indication generated by the system resource itself. For example, target resource 310 may explicitly send a signal 304 (e.g. unicast, multicast or broadcast) to indicate that it is in a particular power condition which may facilitate data traffic from Data Trafficker 1 302. Upon detecting the indication 304 of a power condition of memory 310, Data Trafficker 1 302 may opportunistically initiate a trafficking of data 314 which avails of the power state of memory 310 which is included in the power condition indicated by signal 304. The invention is not limited as to the particular direction of the data traffic which is initiated.

Alternatively or in addition, an indication of a power condition may include an indication generated by a system resource other than a target resource which is a target of the initiated data traffic. For example, an indication of a power condition may include an indication generated by an interface resource such as another data trafficker. In the case of FIG. 3B, Data traffic 328 between Data Trafficker 2 326 and memory 330 via interface 332 may mean that a power condition exists of which Data Trafficker 1 322 may take advantage by initiating its own data traffic 334. For example, such a power condition may include a power state and/or a change in a power state in one or more system resources which may be conducive to data trafficking by Data Trafficker 1 322. In various embodiments, Data Trafficker 2 326 may directly or indirectly send an indication 324 to Data Trafficker 1 322 (e.g. via a path separate from interface 332) indicating at least in part that data traffic 328 is taking place. Alternatively, indication 324 may indicate at least in part that data traffic 328 is expected to take place at some future time. Indication 324 may indicate to Data Trafficker 1 322 that data traffic 328 has resulted in a power condition of a system resource of which Data Trafficker 1 can avail. In response to the detecting of indication 324, Data Trafficker 1 322 may initiate data traffic 334 which takes advantage of the power condition indicated by indication 324.

Alternatively or in addition, an indication of a power condition may include an indication generated by an interface resource. In the case of FIG. 3C, interface 352 may include an interface agent 354 though which data trafficking requests of Data Trafficker 1 322 and Data Trafficker 2 326 are handled. For example, interface agent 354 may variously perform one or more authentication, authorization, connection, coordination or similar services in aid of a given data trafficker trafficking data with a system resource such as memory 330. Data traffic 348 between Data Trafficker 2 346 and memory 350 via interface agent 354 may mean that a power condition exists of which Data Trafficker 1 342 may avail in initiating its own data traffic 344. For example, such a power condition may include an active power condition in a chip-to-chip interconnect of which Data Trafficker 1 342 may also avail.

In various embodiments, interface agent 354 may directly or indirectly send a indication 356 (e.g. unicast, multicast or broadcast) to Data Trafficker 1 342 indicating at least in part that data traffic 348 is taking place. Alternatively, indication 356 may indicate at least in part that data traffic 348 is expected to take place at some future time. Data Trafficker 1 342 may detect from indication 356 that a power condition may be exploited by initiating data traffic 344. In response to the detecting of indication 356, Data Trafficker 1 342 may initiate data traffic 344 which takes advantage of the power condition indicated by indication 356. Alternatively or in addition, an indication of the power condition of a system resource may include an indication which is incidentally generated in the course of operation of the system. An incidental indication of the power condition of a system resource may include an indication which the data trafficking device listens for, polls, requests or otherwise actively acquires from one or more system resources. In the exemplary case of FIG. 3D, interface 372 may include a bus, chip-to-chip interconnect or similar element which enters an active power state in order facilitate data traffic 368 of Data Trafficker 2 366. Alternatively, such an element may enter an active state in the course of its regular operation, e.g. independent of any need to traffic data.

In an embodiment of the invention, Data Trafficker 1 362 actively looks to detect the occurrence 364 of interface 372 including this active state of an interface element. In another embodiment, an occurrence 364 may represent Data Trafficker 1 362 simply detecting that a particular type of data traffic is being carried in interface 372. For the purposes of practicing certain embodiments of the invention, occurrence 364 represents some indication detected by Data Trafficker 1 362 of a power state of a system resource of which Data Trafficker 1 362 may avail in initiating data traffic 374. In response to detecting the occurrence 364, Data Trafficker 1 362 initiates data traffic 374 which takes advantage of the power condition indicated by indication 364.

Figure 4:
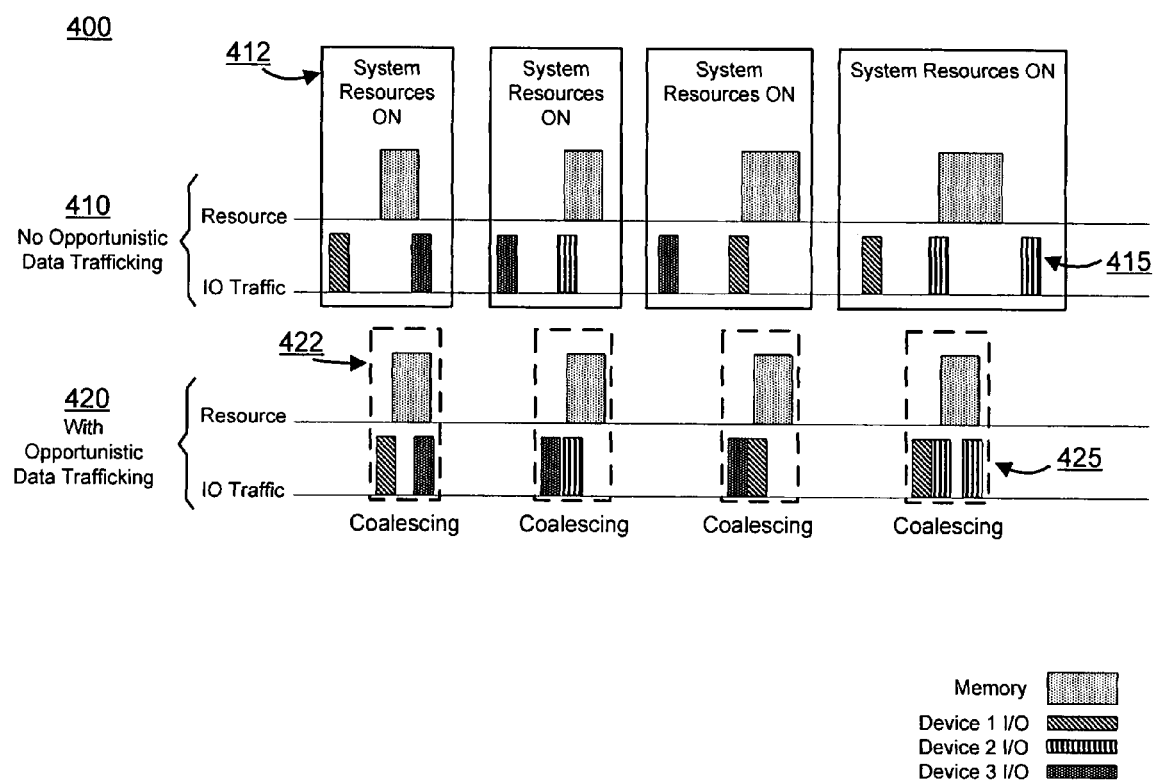
FIG. 4 is a timing diagram illustrating data traffic in a system implementing an embodiment of the invention.

FIG. 4 is a timing diagram 400 including a timing sequence 410 for illustrating the behavior of data trafficking devices when they do not implement an embodiment of the invention and timing sequence 420 for illustrating the behavior of data trafficking devices when they do implement a particular embodiment of the invention. As indicated in the legend of FIG. 4, timing diagram 400 represents activity in a system having at least three devices (Device 1, Device 2 and Device 3) variously trafficking data as input and/or output (I/O) to system resources including Memory. In the case of timing sequence 410, each of Device 1, Device 2 and Device 3 initiates its respective data traffic independent of any indication of a system resource power condition which is not an indication resulting from its own data traffic.

As a result of Device 1, Device 2 and Device 3 not initiating data traffic in order to avail of already existing power conditions, the data traffic of any one device, which may have resulted in a particular power condition, will not, in and of itself, cause another device to initiate its own data traffic in response to detecting an indication of that resulting power condition. Opportunities to initiate data traffic are thereby missed, and consequently, the I/O of a device not implementing an embodiment of the invention may, over time, tend to be more spread out with respect to the I/O of other devices. As the I/O of devices become more spread out over time, system resources including the represented Memory may have to remain in various active power states for longer periods of time, e.g. time period 412. Similarly, system resources may have to come out of power managed states sooner, as data traffic is initiated which might otherwise have been trafficked in a previous active power state.

By way of illustration, timing sequence 410 includes I/O traffic 415 of Device 2 which has come after an opportunity to traffic data with Memory. As a result of Device 2 not initiating data traffic in response to an already existing power condition (e.g. the active power state of Memory) I/O traffic 415 cannot traffic data with Memory. As a result, system resources may have to remain in an active state for a longer period of time in order to find an alternative way to handle I/O traffic 415, or Memory must be brought out of a power managed state sooner in order to facilitate I/O traffic 415. As a result, system resources are also more likely to remain in high power consumption states and/or inefficiently switch between various active and power managed power states, as there is no coordination in the initiation of data traffic of Device 1, Device 2 and Device 3.

By contrast, timing sequence 420 illustrates each of Device 1, Device 2 and Device 3 initiating respective data traffic in response to system resource power conditions which are independent of its own data traffic. As demonstrated by time period 422, I/O traffic of Device 1 has resulted in a system resource power condition which Device 3 may also exploit by initiating its own I/O. In response to detecting an indication of this power condition, Device 3 may initiate its own I/O traffic more quickly than it would have otherwise if Device 3 were not implementing an embodiment of the invention. As a result, I/O traffic from one device implementing an embodiment of the invention is more likely to result in a sequential initiating of I/O traffic from similar devices, resulting in tighter grouping of I/O traffic over time. This tighter grouping allows system resources to variously change to respective power managed states earlier than they might otherwise, and/or remain in their respective power managed states for longer periods than they would otherwise.

By way of illustration, the earlier triggering of I/O traffic 425 by Device 2 results in the ability of Memory to handle I/O traffic 425 before it has transitioned into a power managed state. This may mean that Memory can power down sooner and for a longer period of time, which eventually reduces the frequency with which Memory needs to transition between power states. The reduced power load allows improved system power management. For example, a system resource may power down upon completion of the initiated data traffic. Additionally or alternatively, an interface element such as a phase-locked loop (PLL) or a clock tree coordinating other interface elements may operate in a lower power or lower frequency state.

Figure 5:
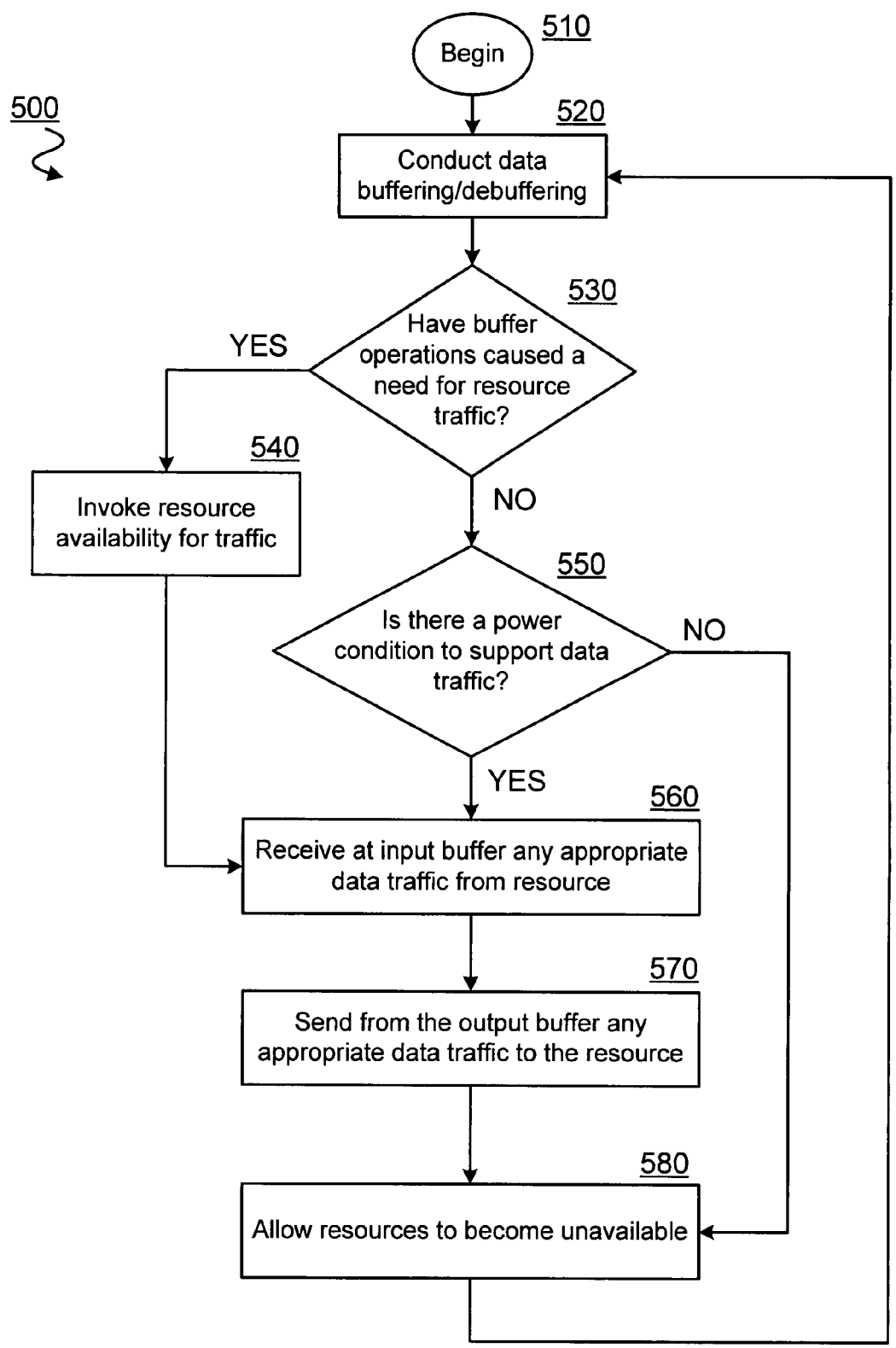
FIG. 5 is a flow diagram illustrating an algorithm according to one embodiment of the invention.

FIG. 5 includes an algorithm 500 implementing a method according to one embodiment of the invention. Algorithm 500 may be implemented, for example, by a data trafficking device including the features of data trafficking device 110. In this exemplary algorithm 500, the data trafficking device includes an input buffer to receive data provided by a target resource and an output buffer to receive data to be sent to a target resource. For the purpose of describing embodiments of the invention, the data trafficking device will only be considered as trafficking input buffer data and output buffer data with a single target resource. It is understood that this exemplary description of an embodiment of the invention may be expanded to include additional and/or alternate types of data traffic and/or additional and/or alternate target resources.

The algorithm begins at 510, with the data trafficking device operable to initiate data traffic with the target resource. At 520, the data trafficking device conducts its own internal buffering and debuffering operations, e.g. those buffer operations which do not require data traffic with the target resource. For example, the data trafficking device may be buffering data to the output buffer and/or debuffering data from the input buffer. At 530, the data trafficking device may determine whether its own internal buffer operations have resulted in a need for data traffic with the target resource. If, at 540, the data trafficking device has created its own need to traffic data with the target resource, the data trafficking device invokes the availability of the target resource for traffic. The invoking may cause the target resource and/or one or more other system resources to transition to an active power state, if some of those resources are not already in their respective power state.

If, at 550, the data trafficking device has not created its own need to traffic data with the target resource, the data trafficking device determines whether there is an already existing power condition of a system resource to support data trafficking of the data trafficking device. In an embodiment of the invention, this determination may be based on an indication which is independent of any data traffic of the data trafficking device. If, at 580, there exists no power condition to support data traffic with the target resource, the data trafficking device allows system resource to become unavailable. However, if, at 560, there does exist some power condition to support data traffic with the target resource, the data trafficking device may receive any appropriate data traffic from the target resource to buffer in the input buffer. At 570, the data trafficking device may send from the output buffer any appropriate data traffic to the target resource. As used herein, appropriate data traffic refers to an exchange of data which has been determined to justify the initiating of data traffic. In one embodiment, determining a data exchange which justifies initiating data traffic may be based on a relative benefit of initiating the data traffic in relation to a performance overhead associated with the initiated of data traffic. For example, an exchange of data to or from a particular buffer may not be appropriate, where the amount of data currently stored in the buffer fails to meet some threshold value. After any appropriate data traffic with the target resource has taken place, at 580, the data trafficking device allows system resource to become unavailable. Then, at 520, the data trafficking device may return to internal buffering operations and/or any other normal procedures, in anticipation of the next need and/or opportunity to initiate data traffic with the target resource.

Figure 6:
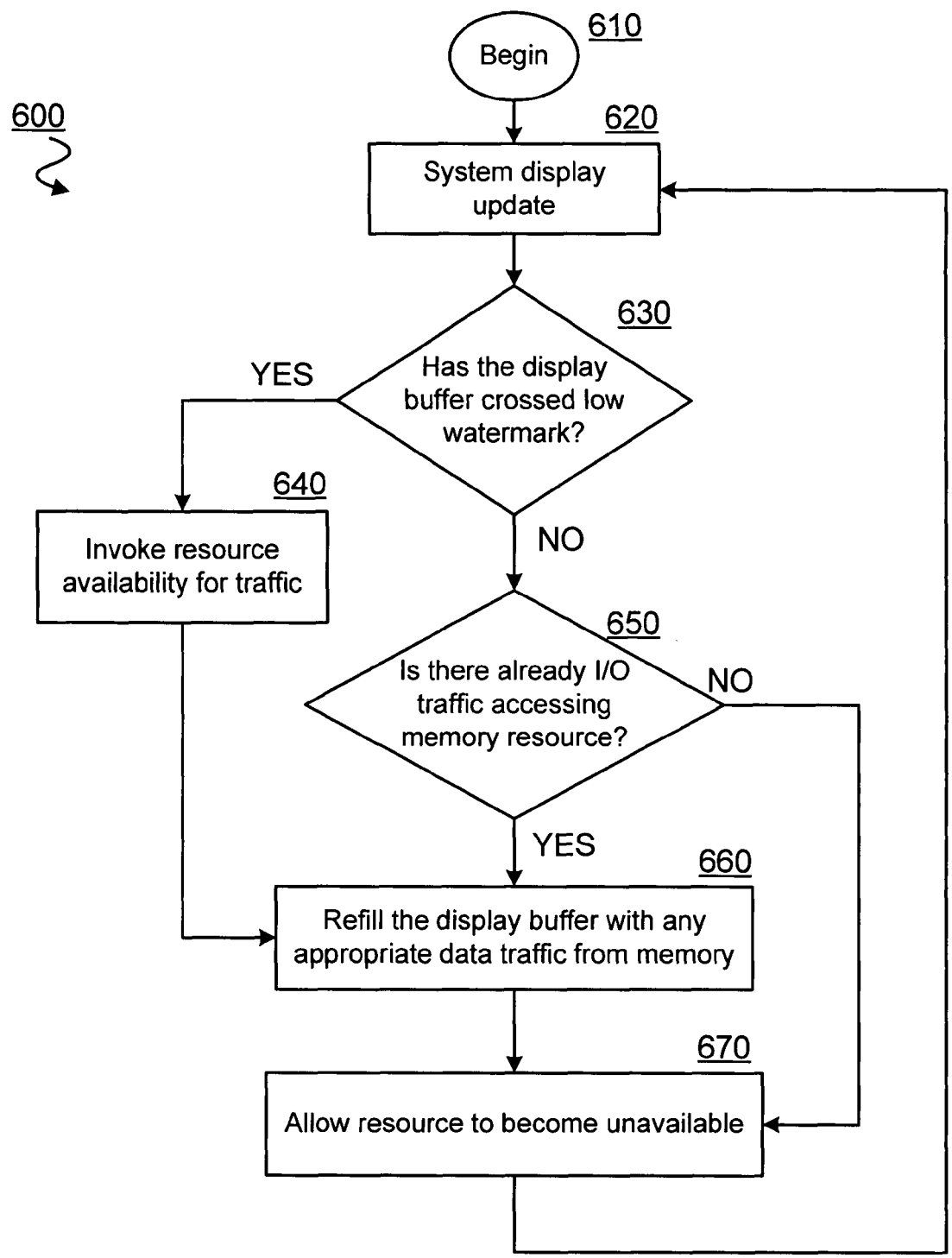
FIG. 6 is a flow diagram illustrating an algorithm according to one embodiment of the invention.

FIG. 6 includes an algorithm 600 implementing a method according to one embodiment of the invention. In this exemplary case, the algorithm 600 may be more particularly implemented by a display device such as a monitor, graphics card, or similar video device. The data trafficking device may variously include the features previously discussed with reference to data trafficking device 110, for example. In this exemplary algorithm 600, the data trafficking device includes an input buffer to receive data provided by a target resource. At various times, the data trafficking device may debuffer an amount of data form the input buffer for use in providing display information. For the purpose of describing embodiments of the invention, the data trafficking device will only be considered as trafficking input buffer data with a single target resource. It is understood that this exemplary description of an embodiment of the invention may be expanded to include additional and/or alternate types of data traffic and/or additional and/or alternate target resources.

The algorithm begins at 610, with the data trafficking device operable to initiate data traffic with the target resource. At 620, the data trafficking device updates a display, wherein data has been debuffered from the input buffer for use in updating the system display. At 630, the data trafficking device may determine whether its display update operations have resulted in a need for the target resource to provide more data for buffering in the input buffer. If, at 640, the display update operations have created a need to traffic data with the target resource, the data trafficking device invokes the availability of the target resource for traffic. The invoking may cause the target resource and/or one or more other system resources to transition to an active power state, if some of those resources are not already in their respective power state.

If, at 650, the display update operations have not created a need to traffic data with the target resource, the data trafficking device determines whether there is an already any other I/O traffic accessing the target resource. The existence of any other I/O traffic accessing the target resource serves as one type of indication that there is an already existing power condition (e.g. the power state of the target resource) of which the data trafficking device may avail in initiating data traffic. If, at 670, there exists no other I/O traffic accessing the target resource, than the data trafficking device allows system resource to become unavailable. However, if, at 660, there does exist some power condition to support data traffic with the target resource, the data trafficking device may receive any appropriate data traffic from the target resource to refill the input display buffer. After any appropriate data traffic with the target resource has taken place, at 670, the data trafficking device allows system resources to become unavailable. Then, at 620, the data trafficking device may return to performing regular system display updates and/or any other normal internal procedures, in anticipation of the next need and/or opportunity to initiate data traffic with the target resource.

Techniques and architectures for trafficking data are described herein. In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated (e.g. as bits, values, elements, symbols, characters, terms, numbers, or the like).

What is claimed is:

1. A method performed at a data trafficking device, the method comprising:
    performing a data buffer operation internal to the data trafficking device;
    in response to the performing the data buffer operation, determining whether the data buffer operation has created a need to exchange data between the data trafficking device and an external resource;
    in response to determining that the data buffer operation has not created the need to exchange data, detecting an indication of a power condition of the external resource, wherein the indication is independent of any data traffic of the data trafficking device; and
    initiating data traffic based on the indication of the power condition.

2. The method of claim 1, wherein the external resource is a target resource for data traffic, and where the indication includes an indication generated by the target resource.

3. The method of claim 1, wherein the indication includes an indication generated by another data trafficking device.

4. The method of claim 1, wherein the indication indicates a condition of an interface resource supporting data traffic between the data trafficking device and a target resource.

5. The method of claim 1, wherein the indication includes an indication generated by an interface agent supporting data trafficking between the data trafficking device and a target resource, the interface agent to coordinate data trafficking on an interface resource.

6. The method of claim 1, wherein the power condition includes at least one of a power state of the external resource and a change in a power state of the external resource.

7. A data trafficking device comprising:
    a buffer to perform a data buffer operation internal to the data trafficking device;
    a detecting unit to determine, in response to the performing the data buffer operation, whether the data buffer operation has created a need to exchange data between the data trafficking device and an external resource, the detecting unit further to detect, in response to determining that the data buffer operation has not created the need to exchange data, an indication of a power condition of the external resource, wherein the indication is independent of any data traffic of the data trafficking device; and
    an initiating unit coupled to the detecting unit, the initiating unit to initiate data traffic based on the indication of the power condition.

8. The data trafficking device of claim 7, wherein the indication includes an indication generated by one of a memory device and another data trafficking device.

9. The data trafficking device of claim 7, wherein the indication indicates a condition of an interface resource supporting data traffic between the data trafficking device and a target resource.

10. The data trafficking device of claim 7, determining whether the data buffer operation has created the need to exchange data between the data trafficking device and the external resource includes comparing an amount of data in the buffer to a predetermined threshold associated with the buffer.

11. The data trafficking device of claim 7, wherein initiating data traffic at the data trafficking device includes sending from the data trafficking device a signal to initiate data traffic.

12. The data trafficking device of claim 7, wherein the data trafficking device includes a data buffer and wherein initiating data traffic at the data trafficking device includes initiating a buffering operation of the data buffer.

13. A system comprising:
a target resource;
an interface resource coupled to the target resource;
a data trafficking device coupled to the interface resource to support data trafficking between the target resource and the data trafficking device, the data trafficking device including
 a buffer to perform a data buffer operation internal to the data trafficking device,
 a detecting unit to determine, in response to the performing the data buffer operation, whether the data buffer operation has created a need to exchange data between the data trafficking device and the target resource, the detecting unit further to detect, in response to determining that the data buffer operation has not created the need to exchange data, an indication of a power condition of at least one of the target resource and the interface resource, wherein the indication is independent of any data traffic of the data trafficking device, and
 an initiating unit coupled to the detecting unit, the initiating unit to initiate data traffic based on the indication of the power condition; and
a transceiver coupled to the data trafficking device.

14. The system of claim 13, wherein the data trafficking device includes an output buffer for a display.

15. The system of claim 13, wherein at least one of the interface resource and the target resource is to change from operating at a higher power state to operating at a lower power state, the changing based at least in part on a completion of the initiated data traffic of the data trafficking device.

16. The system of claim 15, wherein the interface resource includes a phase-locked loop (PLL) and a clock tree, and wherein the interface resource changing from operating at a higher power state to operating at a lower power state includes shutting down at least one of a phase-locked loop and a clock tree.

17. The system of claim 15, wherein the target resource includes a memory, and wherein the target resource changing from operating at a higher power state to operating at a lower power state includes putting the memory into a self-refresh mode.

* * * * *